United States Patent

Mizoguchi et al.

Patent Number: 5,999,594
Date of Patent: *Dec. 7, 1999

[54] CONTROL OF TRANSMISSION OF ELECTRONIC MAIL IN VOICE MESSAGE FORM

[75] Inventors: Naoki Mizoguchi; Hiroshi Fukagawa, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/572,715

[22] Filed: Dec. 14, 1995

[30] Foreign Application Priority Data

Dec. 15, 1994 [JP] Japan .................................. 6-311529

[51] Int. Cl.⁶ .................................................. H04M 1/64
[52] U.S. Cl. .................................... 379/88.14; 379/88.25
[58] Field of Search .................................. 379/67, 88, 89, 379/100, 88.13, 88.14, 88.17, 88.18, 88.25, 88.26

[56] References Cited

U.S. PATENT DOCUMENTS

| | | | |
|---|---|---|---|
| 4,837,798 | 6/1989 | Cohen et al. | 379/88 |
| 4,918,722 | 4/1990 | Duehren et al. | 379/100 |
| 5,333,266 | 7/1994 | Boaz et al. | 395/200 |
| 5,475,738 | 12/1995 | Penzias | 379/88 |
| 5,479,411 | 12/1995 | Klein | 379/93.08 |
| 5,530,740 | 6/1996 | Irribarren et al. | 379/93.24 |
| 5,557,659 | 9/1996 | Hyde-Thomson | 379/88 |
| 5,625,675 | 4/1997 | Katsumaru et al. | 379/88.13 |
| 5,740,231 | 4/1998 | Cohn et al. | 379/89 |

FOREIGN PATENT DOCUMENTS 3-099543   4/1991   Japan .

*Primary Examiner*—Fan S. Tsang
*Attorney, Agent, or Firm*—Foley & Lardner

[57] ABSTRACT

An electronic mail system for transmitting a voice message from a telephone to a mail terminal equipment using an electronic mail, a destination identifier and a voice message are inputted from the telephone. A voice signal is generated in correspondence to the voice message and the destination identifier and the voice signal are transmitted from the telephone to a transceiver apparatus via a telephone line network. In the transceiver apparatus, a voice file is produced from the voice signal received from the telephone via the telephone line network and then the electronic mail is produced from the voice file and the destination identifier. The electronic mail is transmitted to the mail terminal equipment having a voice output function via a local area network (LAN). The mail terminal equipment reproduces the voice message from the voice file of the electronic mail using the voice output function.

18 Claims, 5 Drawing Sheets

Fig. 5

DESTINATION MANAGEMENT TABLE
16-2

| ID | MAIL ADDRESS | TELEPHONE NO. |
|---|---|---|
| 100 | AAA | 111-1111 |
| 101 | BBB | 222-2222 |
| 102 | CCC | 333-3333 |
| 103 | DDD | |
| 104 | EEE | |
| 105 | FFF | |

5,999,594

CONTROL OF TRANSMISSION OF ELECTRONIC MAIL IN VOICE MESSAGE FORM

BACKGROUND OF THE INVENTION

1. Field of the Invention

The present invention relates to an electronic mail transceiver apparatus in an electronic mail system, and more particularly to the transmission of electronic mail in a voice message form in the electronic mail system.

2. Description of Related Art

Generally, a message handled in electronic mail is text data in many cases. However, there is the strong demand to handle voice data in an electronic mail system and an electronic mail system is recently developed in which voice data is inputted from a telephone, as disclosed in Japanese Laid Open Patent Disclosure (Heisei 3-99543).

The electronic mail system disclosed in the above reference is shown in FIG. 1 and includes a mail storage switching apparatus 101 which is composed of a message input/output processing section 102, a mail terminal access processing section 103, a message storing section 104, a correspondency table storing section 105, and a mail box 106. The electronic mail system further includes telephones 112 and 114 and a mail terminal equipment 116. The correspondency table storing section 105 stores a correspondency table in advance. The correspondency table is a set of mail terminal identifier and telephone number provided for each mail terminal equipment.

In such an electronic mail system, when a voice message is to be issued, a user first operates the mail terminal equipment 116 to transmit a message producing request to the mail storage switching apparatus 101. In response to the message producing request, the mail storage switching apparatus 101 searches the correspondency table for a set of mail terminal identifier and telephone number of the request issuing terminal equipment. Then, the mail storage switching apparatus 101 issues to the message input/output processing section 102 an input processing request of a voice message to be inputted from a telephone 112 having the searched telephone number. In response to the input processing request, the message input/output processing section 102 awaits a call from the telephone 112 having the searched telephone number by the user of the request issuing mail terminal equipment 116. When receiving the call, the message input/output processing section 102 acquires the voice message form the telephone 112 and stores the voice message with a message identifier assigned thereto in the message storing section 104. At the time when the acquisition and storage of the voice message is completed, the message input/output processing section 102 sends the message identifier of the stored voice message to the mall terminal access processing section 103 which transmits the message identifier to the request issuing mail terminal equipment 116 as the message producing result. In this manner, the voice message can be handled in the electronic mail system.

However, in the above conventional electric mail system, the mail storage switching apparatus 104 is connected to the telephones 112 and 114 and the mail terminal equipment 116. In order to input a voice message, the user needs to operate not only the telephone 112 but also the mail terminal equipment 116. That is, in the conventional electric mail system, a set of personal computer as the mail terminal equipment and telephone needs to be provided for each user so that numerous investment is necessary for the electronic mail system for a voice message. In addition, there is another problem in that the user cannot execute electronic mail transmission from another place where the personal computer as a mail terminal equipment is not located.

SUMMARY OF THE INVENTION

The present invention is made under the above circumstances and has, as an object, to provide an electronic mail system which includes an electronic mail transceiver apparatus for a voice message using only a telephone.

Another object of the present invention is to provide an interfacial transceiver apparatus for an electronic mail system of a voice message between a telephone line network and a local area network (LAN).

In order to achieve an aspect of the present invention, an electronic mail system for a voice message, includes a telephone connected to a telephone line network, for inputting a destination identifier and inputting a voice message to generate a voice signal corresponding to the voice message, a mail terminal equipment having a voice output function, and connected to a local area network (LAN), and a transceiver apparatus connected to the telephone line network and the (LAN), for receiving the voice signal and the destination identifier from the telephone via the telephone line network, for converting the voice signal into a voice file to produce an electronic mail from the voice signal and the destination identifier, and for transmitting the electronic mail to the mail terminal equipment via the LAN. The mail terminal equipment reproduces the voice message from the voice file of the electronic mail using the voice output function.

The interface transceiver apparatus between a telephone line and a local area network (LAN) in an electronic mail system, includes a conversion table for storing identifiers and LAN addresses respectively corresponding to the identifiers, a transceiver section for receiving a first destination identifier and a first voice signal from the telephone line, a referring section for referring to the conversion table to read out the LAN address based on the first destination identifier, a voice signal converting section for converting the first voice signal received by the transceiver section into the first voice file, and a mail producing section for producing a first electronic mail from the LAN address and the first voice file to transmit the electronic mail onto the LAN.

When another telephone is connected to the telephone line network and the mail terminal equipment issues a call to the other telephone, the conversion table further stores telephone numbers respectively corresponding to the identifiers, and the transceiver section further includes a section for receiving a telephone number and a second voice signal to issue a call based on the telephone number for transmitting the second voice signal onto the telephone line, and the referring section further includes a section for referring to the conversion table to read out the telephone number based on a second destination identifier for supplying the telephone number to the transceiver section, and the voice signal converting section further includes a section for receiving a second electronic mail to convert a second voice file of the second electronic mail into the second voice signal for supplying the second voice signal to the transceiver section.

The transceiver section further includes a voice guidance section for generating and transmitting various types of voice guidance to the first telephone. Therefore, a user can readily input the destination identifier and a voice message from the first telephone. The destination identifier is transmitted from the first telephone as a push button (PB) signal.

In order to achieve another aspect of the present invention, a method of transmitting a voice message from a telephone to a mail terminal equipment using an electronic mail, comprising the steps of:

inputting a destination identifier and a voice message from the telephone;

generating, in the telephone, a voice signal corresponding to the voice message;

transmitting the destination identifier and the voice signal from the telephone via a telephone line network;

producing, in an interface, a voice file from the voice signal received from the telephone via the telephone line network to produce the electronic mail from the voice file and the destination identifier;

transmitting the electronic mail to the mail terminal equipment having a voice output function via a local area network (LAN); and reproducing the voice message from the voice file of the electronic mail using the voice output function.

BRIEF DESCRIPTION OF THE DRAWINGS

FIG. 5 is a destination management table which storing designation management information.

DESCRIPTION OF THE PREFERRED EMBODIMENTS

The electronic mail system for a voice message of the present invention will be described below in detail with reference to the accompanying drawings.

Figure 1:
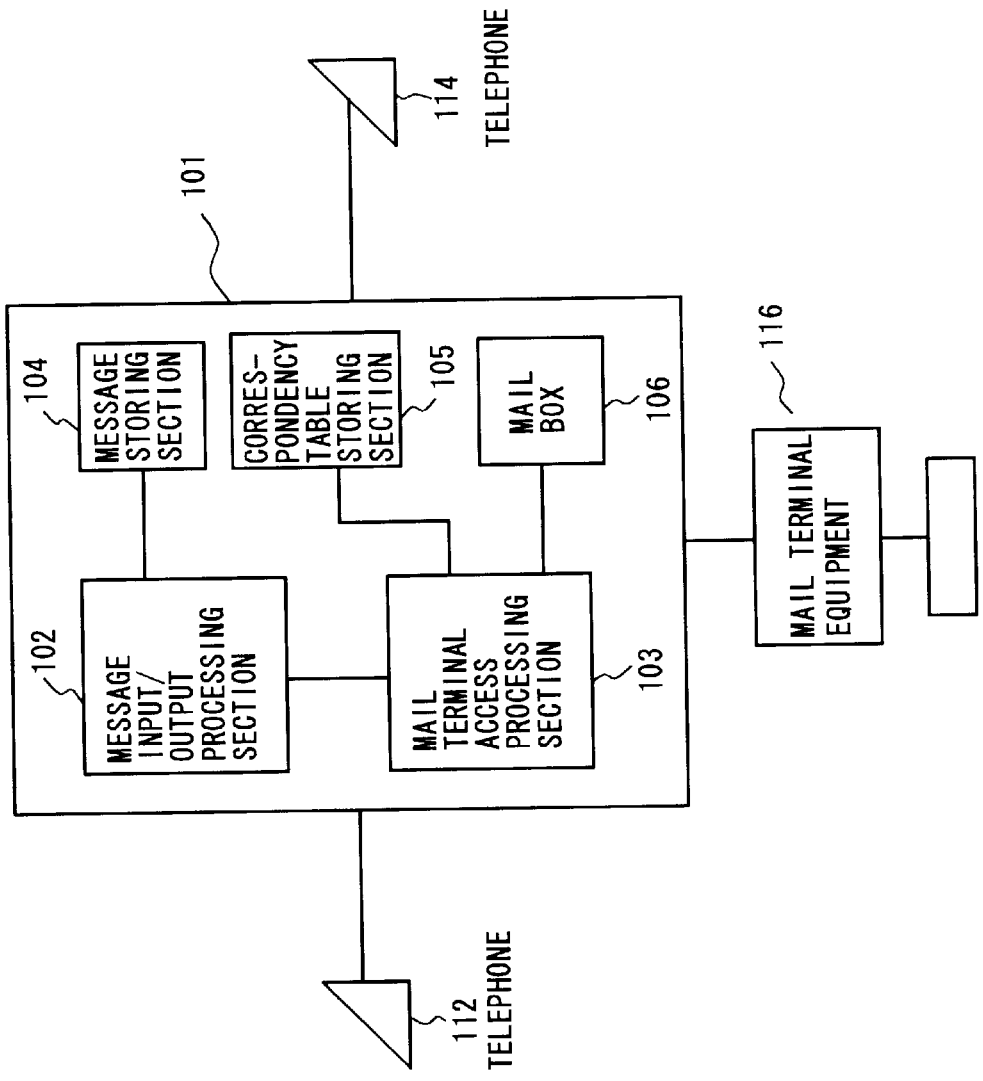
FIG. 1 is a block diagram of a conventional electronic mail system of a voice message.
Figure 2:
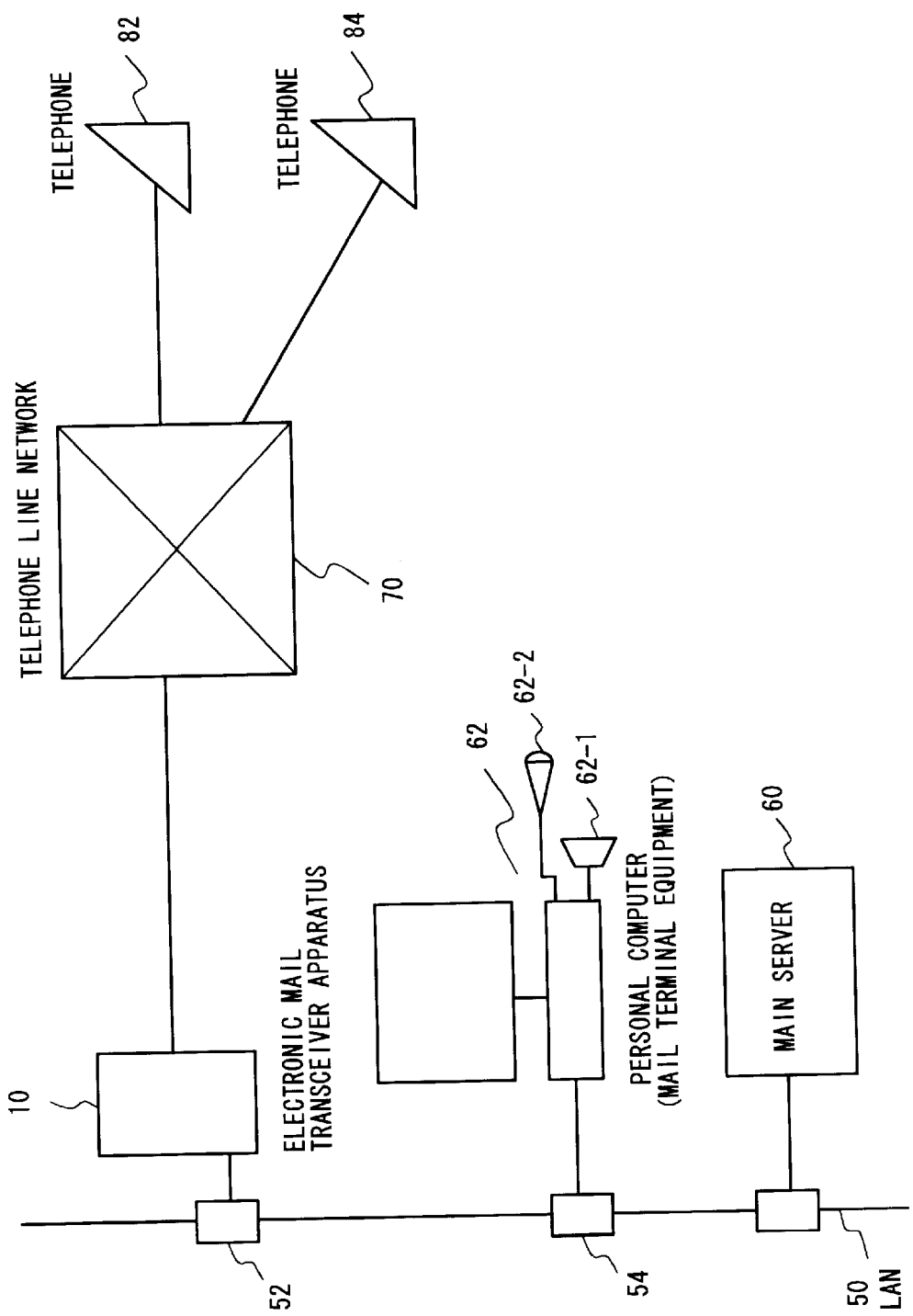
FIG. 2 is a block diagram of an electronic mail system according to an embodiment of the present invention.

FIG. 2 is a block diagram illustrating the electronic mail system according to an embodiment of the present invention. Referring to FIG. 2, the electronic mail system includes an electronic mail transceiver apparatus 10 as an interface apparatus between a telephone line network 70 which is connected to telephones 82 and 84 of a type of push phone and a local area network (LAN) 50 which is connected to a personal computer 62 as a mail terminal equipment and a main server 60. The telephone line network 70 may be a public telephone line network or a private telephone line network. The mail terminal equipment 62 includes a speaker 62-1 to achieve a voice output function and a microphone 62-2 to achieve a voice input function, in addition to ordinary functions. Also, the mail terminal equipment 62 can execute a voice processing program. When executing the voice processing program, the mail terminal equipment 62 outputs a voice corresponding to a voice file from the speaker 62-1 and produces a voice file corresponding to a voice speech inputted from the microphone 62-2. The main server 60 receives an electronic mail on the LAN 50 and delivers the electronic mail to a destination mail terminal equipment in accordance with a destination LAN address of the electronic mail.

Figure 3:
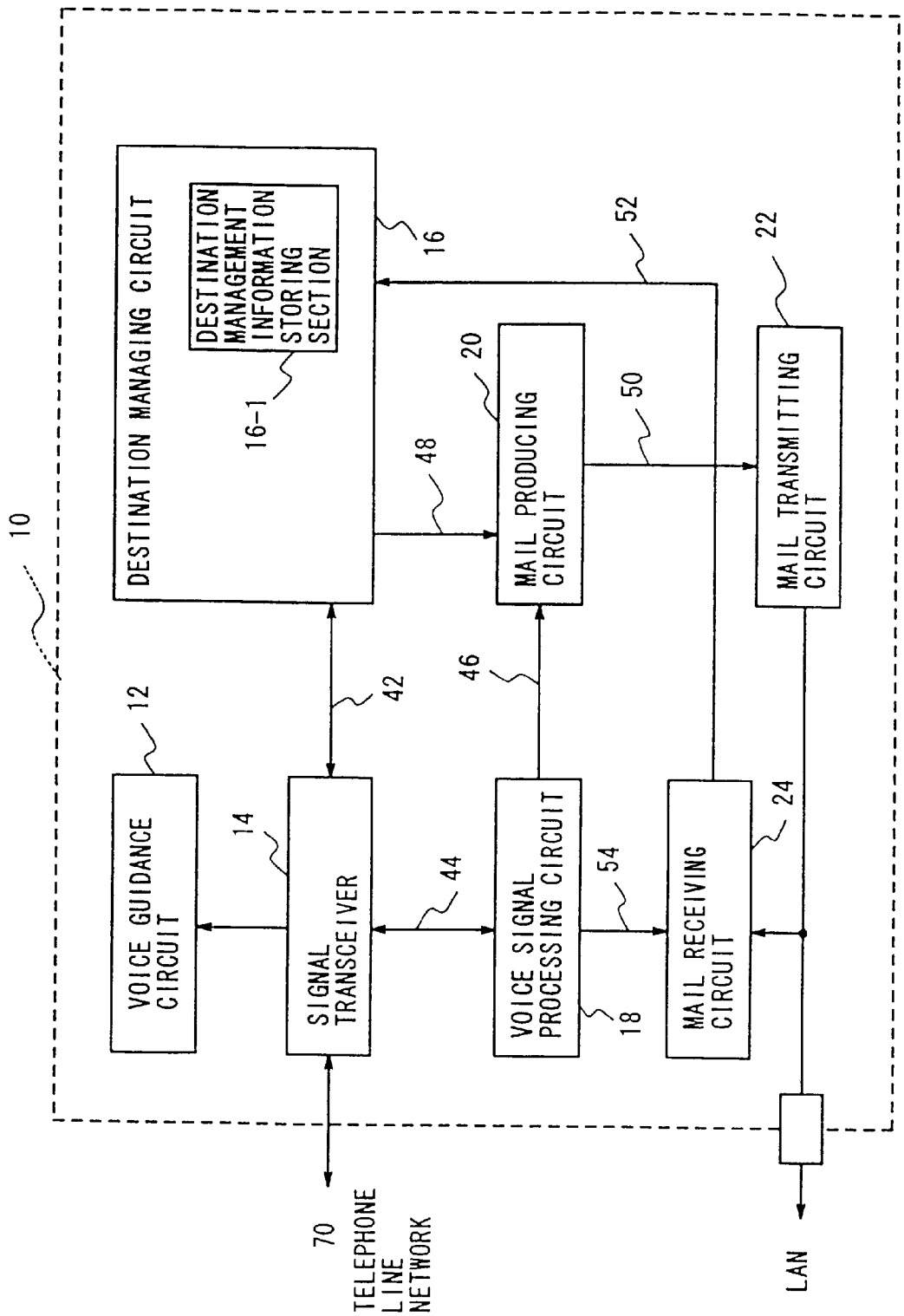
FIG. 3 is a block diagram of an electronic mail transmitting apparatus used in the electronic mail system shown in FIG. 2 according to an embodiment of the present invention.

FIG. 3 is a block diagram of the electric mail transceiver apparatus 10 according to an embodiment of the present invention. Referring to FIG. 3, the electric mail transceiver apparatus 10 is composed of a voice guidance circuit 12, a signal transceiver circuit 14, a destination managing circuit 16 having a destination management information storing section 16-1, a voice signal processing circuit 18, a mail producing circuit 20, a mail transmitting circuit 22, and a mail receiving circuit 24.

The signal transceiver circuit 14 is connected to the telephone line network 70 via a telephone line and receives a push button (PB) signal and a voice signal on the telephone line. The signal transceiver circuit 14 includes a modem (not shown). The modem circuit is well known and the description will be omitted. When a call is received from the telephone line network 70, the signal transceiver circuit 14 initiates the voice guidance circuit 12 to output a first type of voice guidance to the telephone line network 70. Also, when receiving a source identifier and a destination identifier, the signal transceiver circuit 14 initiates the voice guidance circuit 12 to output second and third types of voice guidance to the telephone line network 70, respectively. Also, the signal transceiver circuit 14 sends the source and destination identifiers to the destination managing circuit 16. When receiving a voice signal, the signal transceiver circuit 14 sends the voice signal to the voice signal processing circuit. Further, when receiving a destination telephone number from the destination managing circuit 16, the signal transceiver circuit 14 issues a call on the telephone line network 70 and transmits a voice signal from the voice signal processing circuit 18 to the telephone line network 70 if a channel is established based on the call.

The destination managing circuit 16 includes the destination management information storing section 16-1 which stores a destination management table as shown in FIG. 5. The destination management table stores a destination information set of identifier, mail address, and telephone number provided for each of users registered in the electronic mail system. When receiving the source and destination identifiers from the signal transceiver circuit 14, the managing circuit 16 searches the management table for mail addresses corresponding to the source and destination identifiers to output to the mail producing circuit 20. On the other hand, when receiving a destination mail address from the mail receiving circuit 24, the managing circuit 16 searches the management table for a destination telephone number corresponding to the destination mail address to supply to the signal transceiver circuit 14.

When receiving a voice signal from the signal transceiver circuit 14, the voice signal processing circuit 18 converts the voice signal into a binary voice file to supply to the mail producing circuit 20. Also, when receiving a voice file from the mail receiving circuit 24, the voice signal processing circuit 18 converts the voice file into a voice signal to supply to the signal transceiver circuit 14.

The mail producing circuit 20 produces an electronic mail of voice message by combining the source and destination mail addresses from the destination managing circuit 16 and the voice file from the voice signal processing circuit 18. The mail transmitting circuit 16 transmits the produced electronic mail message to the mail terminal equipment as the destination via the main server 60 through the LAN 50. The mail receiving circuit 24 receives an electronic mail from the LAN 50 and sends the destination address of the electronic mail to the destination managing circuit 16 and the voice file of the electronic mail to the voice signal processing circuit 18.

Figure 4:
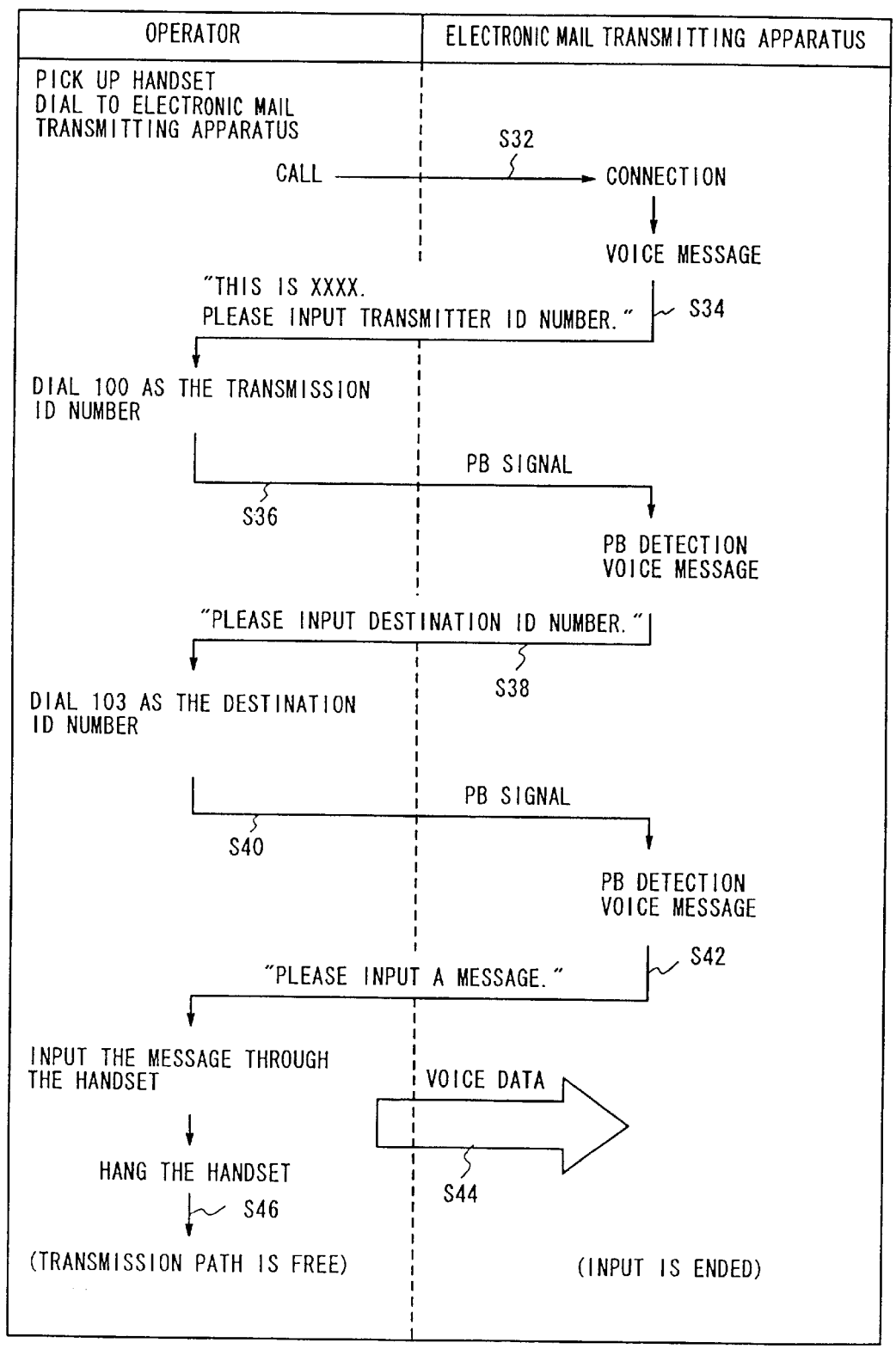
FIG. 4 is a sequence diagram illustrating the sequence when a voice message is transmitted.

Next, the operation of the electronic mail system including the electronic mail transceiver apparatus 10 according to the embodiment of the present invention will be described below with reference to FIG. 4. Referring to FIG. 4, in a reception mode, a user first hooks off a handset of the push phone 82 to call the electronic mail transceiver apparatus 10 via the telephone line network 70 in a step S32. The signal transceiver circuit 14 receives the call and initiates the voice guidance circuit 12. The voice guidance circuit 12 outputs a voice message for operation guidance to the telephone 82 via the telephone line network 70 in a step S34. That is, the voice guidance circuit 12 generates the first type of voice guidance, "This is a XXXXX. Please input your ID number." and the first voice guidance is transmitted to the caller telephone 82. The caller inputs the ID number as the transmission source identifier which is transmitted to the electronic mail transceiver apparatus 10 as a push button (PB) signal in a step S36. Assume that the transmission source ID number is "100", for example.

When receiving the PB signal, the signal transceiver circuit 14 detects and extracts the transmission source identifier, "100", from the received PB signal to supply to the destination managing circuit 16. The destination managing circuit 16 searches the destination management table shown in FIG. 5 in accordance with the transmission source identifier "100". As a result, when a mail address "AAA" is searched, the destination managing circuit 16 outputs the mail address "AAA" to the mail producing circuit 20.

Subsequently, the voice guidance circuit 12 generates the second type of voice guidance of "Please input a destination ID number." and transmits via the telephone line network 70 to the user telephone 82 in a step S38. By listening the second type of voice message, the user inputs the destination ID number, e.g., "103" in this example. The destination ID number Is transmitted to the electronic mail transceiver apparatus 10 via the telephone line network 70 In a step 40. When receiving the PB signal as the destination identifier, the signal transceiver circuit 14 detects and extracts the destination identifier, "103", from the received PB signal to supply to the destination managing circuit 16. The designation managing circuit 16 searches the destination management table in accordance with the destination identifier "103". As a result, when a mail address "DDD" is searched, the destination managing circuit 16 outputs the mail address "IDDD" to the mail producing circuit 20.

Subsequently, the voice guidance circuit 12 generates the third type of voice guidance of "Please input a message." and transmits via the telephone line network 70 to the user telephone 82 in a step S42. By listening the third type of voice message, the user inputs the voice message. The voice message is converted into a voice signal and transmitted to the signal transceiver circuit 14. When receiving the voice signal, the transceiver circuit 14 supplies It to the voice signal processing circuit 18. After all the message is completely inputted, the user hooks the handset on the telephone 82. At the time, the processing circuit 18 converts the voice signal into a voice file using a conversion program to supply to the mail producing circuit 20. The mail producing circuit 20 combines the voice file from the processing circuit 18 and the mail addresses from the managing circuit 16 to produce an electronic mail to supply to the mail transmitting circuit 22. The mail transmitting circuit 22 transmits the electronic mail to the mail terminal equipment 62 via the main server 60 through the LAN 50. In the mail terminal equipment 62, the voice file is extracted from the electronic mail and converted into a voice signal to reproduce the voice message. The reproduced voice message is outputted from the speaker 62-1. In this manner, the user can transmit a voice message to a mail terminal equipment only by operating the telephone.

Next, in a transmission mode, an operator of the mail terminal equipment 62 inputs a voice message through the microphone 62-2. The terminal equipment 62 converts a voice signal corresponding to the voice message into a voice file. This operation is the same as in the voice signal processing circuit 18 in the reception mode. An electronic mail is produced from the voice file and destination and source mail address inputted from a keyboard (not shown) and transmitted to the electronic mail transceiver apparatus 10 via the main server 60. In the transceiver apparatus 10, the electronic mail is received by the mail receiving circuit 24 and the destination mail address is sent to the managing circuit 16 to be converted into a telephone number in the same manner as described above. The voice file is sent to the voice signal processing circuit 18 and converted into a voice signal. This is an inverse operation to the above described operation. The transceiver apparatus 14 issues a call onto a message box (not shown) of the telephone line network 70. When a channel is established, the transceiver apparatus 14 sequentially outputs the destination telephone number and the voice signal to the message box. The message box informs the presence of message to the telephone 84. When a user of the telephone 84 hooks off the handset and calls the message box, the voice message is transmitted to the telephone 84.

In the above description, the voice message is transmitted to the mail box. However, the voice message may be directly transmitted to the telephone 84.

As described above, according to the present invention, a voice message signal on the telephone line is converted into a binary voice file and the electronic mail is produced from the voice file and transmitted onto the LAN. Therefore, an electronic mail of a voice message can be transmitted only with a simple operation of a telephone. As a result, an electronic mail of a voice message can be transmitted from any place where a telephone is located.

Further, according to the present invention, an electronic mail system can be constructed with a low cost since a mail terminal equipment as described in the reference is not required.

What is claimed is:

1. An electronic mail system for a voice message, comprising:

a telephone connected to a telephone line network, for inputting a destination identifier and inputting a voice signal for a voice message;

a mail terminal equipment having a voice output function to output said voice message from a voice file, and connected to a local area network (LAN); and an electronic mail transmitting apparatus connected to the telephone line network and the LAN, for receiving the voice signal and the destination identifier from said telephone via the telephone line network, for performing a first conversion of the voice signal into the voice file to produce an electronic mail from the voice file and the destination identifier, and for transmitting said electronic mail to said mail terminal equipment via the LAN, wherein said mail terminal equipment reproduces the voice message from the voice file of the electronic mail using the voice output function without sending the voice file to said electronic mail transmitting apparatus, wherein said mail terminal equipment is capable of inputting another voice signal and performing a second conversion of said another voice signal into another voice file, and wherein said second conversion is the same as said first conversion.

2. An electronic mail system according to claim 1, wherein said electronic mail transmitting apparatus includes:
a conversion table for storing identifiers and LAN addresses respectively corresponding to the identifiers;
receiving means for receiving the destination identifier and the voice signal;
address converting means for referring to said conversion table to read out the LAN address based on the destination identifier when the destination identifier is received by said receiving means;
voice signal converting means for converting the voice signal into said voice file when the voice signal is received by said receiving means; and
mail producing means for producing the electronic mail from the LAN address and the voice file to transmit the electronic mail to said mail terminal equipment.

3. An electronic mail system according to claim 2, wherein said electronic mail transmitting apparatus further includes voice guidance means responsive to a call from said telephone, for generating and transmitting voice guidance to said telephone.

4. An electronic mail system according to claim 3, wherein said voice guidance means generates and transmits a different type of voice guidance in response to the reception of the destination identifier.

5. An electronic mail system according to claim 1, wherein said telephone is a push button phone and the destination identifier is transmitted from said telephone to said electronic mail transmitting apparatus as a push button (PB) signal.

6. A method of transmitting a voice message from a telephone to a mail terminal equipment using an electronic mail, comprising the steps of:
inputting a destination identifier and a voice signal for a voice message from said telephone;
transmitting the destination identifier and the voice signal from said telephone via a telephone line network;
producing, in an interface, a voice file from the voice signal received from said telephone via said telephone line network to produce the electronic mail from the voice file and the destination identifier;
transmitting, using an electronic mail transmitting apparatus, said electronic mail to a mail terminal equipment having a voice output function via a local area network (LAN); and
reproducing the voice message from the voice file of the electronic mail using the voice output function in said mail terminal equipment without sending the voice file to said electronic mail transmitting apparatus,
wherein said step of producing includes converting said voice signal into said voice file in a first converson,
wherein said mail terminal equipment is capable of inputting another voice signal and performing a second conversion of said another voice signal into another voice file, and
wherein said second conversion is the same as said first conversion.

7. A method according to claim 6, wherein said producing step comprises the steps of:
receiving the destination identifier and the voice signal from said telephone via said telephone line network;
referring to a conversion table storing identifiers and LAN addresses respectively corresponding to the identifiers to read out the LAN address based on the destination identifier;
performing said first conversion of converting said voice signal into said voice file; and
producing the electronic mail from the LAN address and the voice file to transmit the electronic mail to said mail terminal equipment.

8. A method according to claim 6, wherein said inputting step comprises the steps of:
issuing a call to said mail terminal equipment;
generating a first voice guidance in response to said call such that said first voice guidance is outputted from said telephone;
inputting the destination identifier in response to said first voice guidance;
generating, a second voice guidance in response to said destination identifier such that said second voice guidance is outputted from said telephone;
inputting the voice message in response to said second voice guidance.

9. A method according to claim 6, wherein said telephone is a push button phone and the destination identifier is transmitted from said telephone to said interface as a push button (PB) signal.

10. An electronic mail system for a voice message, comprising:
a first telephone connected to a telephone line network, for inputting a first destination identifier and inputting a first voice signal for a first voice message;
a second telephone connected to the telephone line network, for receiving a second voice signal via the telephone line network to reproduce a second voice message from the second voice signal;
an electronic mail transceiver apparatus connected to the telephone line network and a local area network (LAN), for receiving the first voice signal and the first destination identifier from said first telephone via the telephone line network, for performing a first conversion of the first voice signal into a first voice file to produce a first electronic mail from the first voice file and the first destination identifier such that the first electronic mail is transmitted on the LAN, and for receiving a second voice file with a second destination identifier as a second electronic mail via the LAN, for performing a second conversion to produce the second voice signal from the second voice file, to transmit the second voice signal to said second telephone in accordance with the second destination identifier; and
a mail terminal equipment connected to the LAN and having a voice output function and voice input function, for reproducing the first voice message from the first electronic mail transmitted from said electronic mail transceiver apparatus using the voice output function without transmitting the first electronic mail to said electronic mail transceiver apparatus, and for inputting the second voice message and the second destination identifier using the voice input function without being called by said electronic mail transceiver apparatus to convert the second voice message into the second voice file such that the second voice file with the second destination identifier is transmitted to said electronic mail transceiver apparatus,
wherein said mail terminal equipment is capable of inputting a third voice signal and performing a third conversion of said third voice signal into a third voice file, and
wherein said third conversion is the same as said first conversion.

11. An electronic mail system according to claim 10, wherein said electronic mail transceiver apparatus includes:

a conversion table for storing identifiers, LAN addresses respectively corresponding to the identifiers, and telephone numbers respectively corresponding to the identifiers;

transceiver means for receiving the first destination identifier and the first voice signal from said first telephone via the telephone network and for receiving a telephone number and the second voice signal to call said second telephone based on the telephone number to transmit the second voice signal via the telephone line network;

referring means for referring to said conversion table to read out the LAN address based on the first destination identifier when the first destination identifier is received by said transceiver means and to read out the telephone number based on the second destination identifier;

voice signal converting means for converting the first voice signal received by said transceiver means into the first voice file and for converting the second voice file into the second voice signal to supply to said transceiver means; and mail producing means for producing an electronic mail from the LAN address and the first voice file to transmit the electronic mail to said mail terminal equipment.

12. An electronic mail system according to claim 11, wherein said electronic mail transceiver apparatus further includes voice guidance means responsive to a call and inputs from said first telephone, for generating and transmitting different types of voice guidance to said first telephone.

13. An electronic mail system according to claim 10, wherein said first telephone is a push button phone and the first destination identifier is transmitted from said first telephone to said electronic mail transmitting apparatus as a push button (PB) signal.

14. An electronic mail system for a voice message, including an interface apparatus between a telephone line and a local area network (LAN) and a mail terminal equipment, comprising:

a conversion table for storing identifiers and LAN addresses respectively corresponding to the identifiers;

transceiver means for receiving a first destination identifier and a first voice signal from the telephone line;

referring means for referring to said conversion table to read out the LAN address based on the first destination identifier;

voice signal converting means for performing a first conversion of the first voice signal received by said transceiver means into the first voice file; and mail producing means for producing a first electronic mail from the LAN address and the first voice file to transmit the electronic mail onto said LAN for forwarding to the mail terminal equipment, wherein the mail terminal equipment is capable of inputting another voice signal and performing a second conversion of said another voice signal into another voice file, and wherein said second conversion is the same as said first conversion.

15. An electronic mail system according to claim 14, wherein said electronic mail transceiver apparatus further includes voice guidance means responsive to an incoming call via said telephone line, for generating different types of voice guidance.

16. A transceiver apparatus according to claim 14, wherein said conversion table further stores telephone numbers respectively corresponding to the identifiers, and wherein said transceiver means further includes means for receiving a telephone number and a third voice signal to issue a call based on the telephone number for transmitting the third voice signal onto the telephone line, and wherein said referring means further includes means for referring to said conversion table to read out the telephone number based on a second destination identifier for supplying the telephone number to said transceiver means, and wherein said voice signal converting means further includes means for receiving a second electronic mail to convert a third voice file of the second electronic mail into the third voice signal for supplying the third voice signal to said transceiver means.

17. An electronic mail system according to claim 16, wherein said electronic mail transceiver apparatus further includes voice guidance means responsive to a call from said first telephone, for generating and transmitting different types of voice guidance onto said telephone line.

18. An electronic mail system according to claim 10, wherein the first destination identifier is transmitted to said transceiver apparatus as a push button (PB) signal.

* * * * *